United States Patent [19]

Nercessian

[11] 4,335,445
[45] Jun. 15, 1982

[54] SYSTEM FOR INTERFACING COMPUTERS WITH PROGRAMMABLE POWER SUPPLIES

[75] Inventor: Sarkis Nercessian, Flushing, N.Y.

[73] Assignee: Kepco, Inc., Flushing, N.Y.

[21] Appl. No.: 15,453

[22] Filed: Feb. 26, 1979

[51] Int. Cl.³ .............................................. G06F 3/00
[52] U.S. Cl. .................................... 364/900; 363/78;
340/347 M; 364/483
[58] Field of Search ...................... 363/78, 79; 323/17,
323/322; 364/900 MS File, 200 MS File, 483;
340/347 DA, 347 SH, 347 M; 235/92 SH;
307/221 R; 330/297

[56] References Cited

U.S. PATENT DOCUMENTS

| | | | |
|---|---|---|---|
| 3,432,813 | 3/1969 | Annunziata et al. | 364/200 |
| 3,573,741 | 4/1971 | Gavril | 364/200 |
| 3,617,711 | 11/1971 | Smyth | 340/347 DA |
| 3,828,325 | 8/1974 | Stafford | 364/200 |
| 3,846,763 | 11/1974 | Riikonen | 364/900 |
| 3,877,026 | 4/1975 | Wintz et al. | 340/347 SH |
| 3,940,673 | 2/1976 | Darlington | 340/347 SH |
| 3,976,981 | 8/1976 | Bowden | 364/900 |
| 4,047,162 | 9/1977 | Dorey et al. | 364/200 |
| 4,149,256 | 4/1979 | Sumi et al. | 340/347 SH |

OTHER PUBLICATIONS

"Analog-Digital Conversion Handbook", Daniel H. Sheingold, 1972, pp. I-41 to I-64 and III-73 to III-86.
ISSCC 74/Feb. 15, 1974, "A Complete Monolithic Sample/Hold Amplifier using Compatible Bipolar and Silicon-Gate FET Device", pp. 190-191.
"Architecture of a Universal Communication Processor", by Steele and Mattson, Nov. 73, pp. 63-68.
"Data Acquisition in a Dip Shrinks Systems", Calkins and Berg Jr., Electronics, Jul. 1976, pp. 78-83.

*Primary Examiner*—Gareth D. Shaw
*Assistant Examiner*—Eddie P. Chan
*Attorney, Agent, or Firm*—Alfred W. Barber

[57] ABSTRACT

Programmable power supplies as used in automatic testing systems (ATS) require three commands from a computer; namely, polarity, gain and analog magnitude. Whether received from a general purpose bus such as the IEEE 488 or other means the commands are in parallel format and must be serialized. The three commands must be recognized and decoded and applied to the appropriate power supplies. The present invention in addition to furnishing the above responses, provides optical isolation to eliminate possible ground loops and other voltage difference problems. One significant simplification comprises the use of sample and hold amplifiers in place of the more conventional latches so that new commands can be accumulated without affecting the response to a prior command.

3 Claims, 11 Drawing Figures

PRIOR ART

| INPUT | | SWITCH CONDITION | | | | | | OUTPUT | |
|---|---|---|---|---|---|---|---|---|---|
| ATT | SGN | 152 | 151 | 164 | 154 | 156 | 158 | POL. | GAIN |
| 0 | 0 | OFF | OFF | ON | OFF | ON | OFF | — | X0.1 |
| 0 | 1 | OFF | ON | OFF | OFF | OFF | ON | + | X0.1 |
| 1 | 0 | OFF | OFF | ON | ON | OFF | OFF | — | X1.0 |
| 1 | 1 | ON | OFF | OFF | OFF | OFF | ON | + | X1.0 |

Fig.10

SYSTEM FOR INTERFACING COMPUTERS WITH PROGRAMMABLE POWER SUPPLIES

PRIOR ART

U.S. Pat. No. 3,810,103 entitled "Data Transfer Control Apparatus" describes and claims a data transfer system which is described as follows in the "Abstract" of the Patent:

"An improved data transfer system enables a common data source to operate asynchronously with a plurality of different data receivers at a data transfer rate that is limited only by the operating rates of the data receivers and the data source. The operating conditions of the data receivers are sensed in common by the data source and the operating condition of the data source is sensed by the data receivers in order to optimize the data transfer rate without loss of data and with restriction to a predetermined (or synchronous) data transfer rate".

The above designated patent was assigned to Hewlett-Packard Co., of Palo Alto, Calif. and the system it describes has been accepted and is known as the IEEE or the HP-IB interface to be designated here below as the GP-IB (General Purpose Interface Bus).

In its standard form the GP-IB (Hewlett Packard Interface Bus) employs 16 lines to interconnect up to 15 instruments. Eight of these lines are used to transmit data and the remaining eight are used for communication timing (Handshake) and control. Data is transmitted as a series of eight-bit "bytes", normally using the seven-bit ASCII (American Standard Code for Information Interchange) plus an eighth bit available for parity checking. Data is transferred by an interlocked "handshake" technique permitting asynchronous communication over a wide range of data rates.

Communications between devices on the GP-IB bus system must be able to perform at least one of the functions designated as "Listener", "Talker" and "Controller". The "Listener" is a device capable of receiving data from other instruments as, for example, printers, programmable power supplies, display devices, programmable signal sources and the like. The "Talker" is a device capable of transmitting data to other instruments as, for example, tape readers, voltmeters putting out data, counters putting out data and the like. The "Controller" is a device capable of managing communications over the GP-IB as, for example, addressing and sending commands as from a calculator or computer with appropriate 1/O interfacing. Only one device at a time may act as an active talker although up to 14 devices may be simultaneous listeners and only one device at a time may be an active controller.

For further details reference is made to the publication entitled "Condensed Description of the Hewlett Packard Interface Bus part No. 95401-90030."

The Present Invention

In order to expand the usefulness of the GP-IB concept, the present invention provides a unique digital programming system which has the commercial designation SN-488 which designation will be used below for convenience in the disclosure. The SN-488 is intended for use in controlling voltage programmable power supplies and contains circuits for responding to listener mode of the GP-IB only. The SN-488 comprises two main components, first, an interface to operate between the GP-IB and an internal bus, and, second, a program card to operate between this internal bus and up to 8 programmable power supplies (16 functions). Thus, using only a single GP-IB bus connection (intended for controlling a single instrument) the SN-488 makes possible the control of up to 8 programmable power supplies which would otherwise require over half of the 15 connection capacity of the GP-IB.

The first stage of the SN-488, the interface, provides means responding to the handshake signals, listen and unlisten commands and converts the ASCII (8 line) input to hexadecimal byte-serial stored in a read only memory (ROM coupled to the internal bus of the SN-488. The second stage, the program card, recognizes a particular address, shifts the ROM stored data to a series of latches, followed by two digital to analog converters (DAC) which in turn provide programming analog voltages to the power supplies to be programmed. Along with the amplitude commands are range and polarity commands (bytes) which are also processed in the same manner to provide range and polarity control signals in the latches and thence to the programmed power supplies.

In the preferred form of the invention the programmable amplifiers operated in sample and hold mode make possible a substantial simplification of the overall circuitry and, in particular, the elimination of the second memory i.e the latches.

Figure 1:
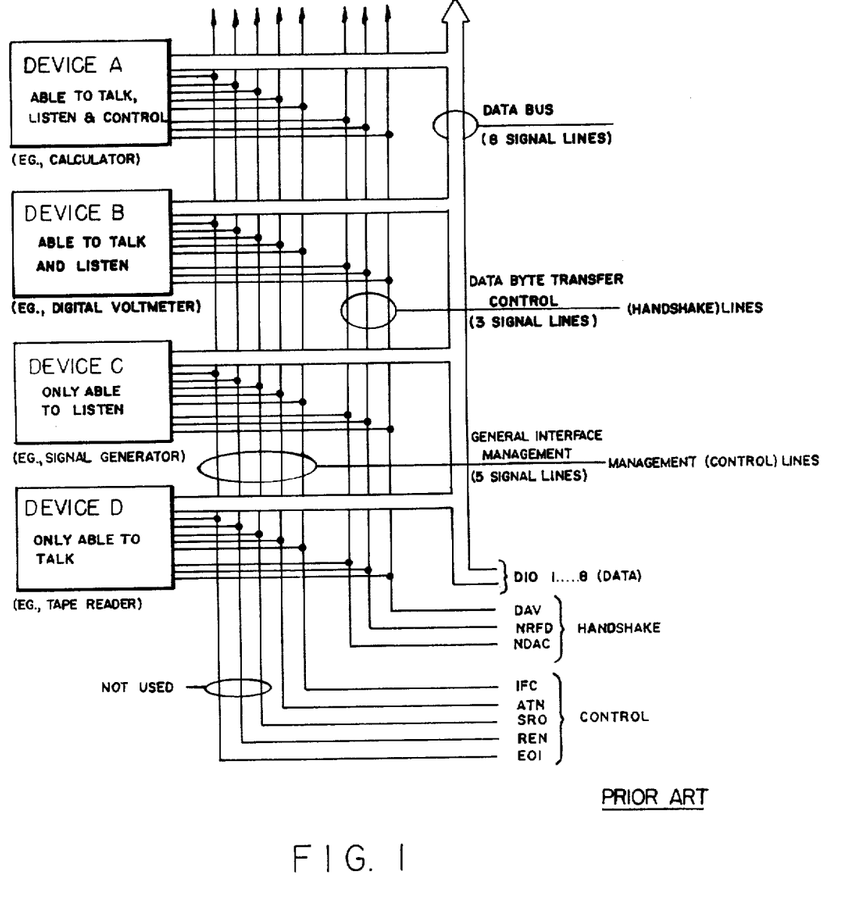
FIG. 1 is a block diagram illustrating the bus structure and interface connections of GP-IB. (Prior Art).

FIG. 1 is a block diagram showing the GP-IB bus structure comprising eight dedicated lines plus an eight line data bus. The dedicated lines are designated in two groups. The first group of three lines are designated as "handshake" lines and the second group of five lines as "control" lines. The three handshake lines include DAV, data valid; NRFD, not ready for data; and NDAC, no data accepted. Of the five control lines, only two are used in the present invention, namely, ATN, attention and IFC, interface clear. The SN-488 system of the present invention has no talk-back provisions and hence has no need for the other lines, SRQ, REN and EOI. To illustrate typical applications of the GP-IB, four devices are shown connected to the bus. The first device designated "A" is able to "talk", "listen" and "control" such as a calculator. The second device designated "B" is able to "talk" and "listen" as, for example, a digital voltmeter. The third device designated "C" is only able to "listen" as, for example a signal generator. The fourth device designated "D" is only able to "talk" as, for example, a tape recorder. In the system of the present invention, devices that listen only (C) are to be discussed.

Figure 2:
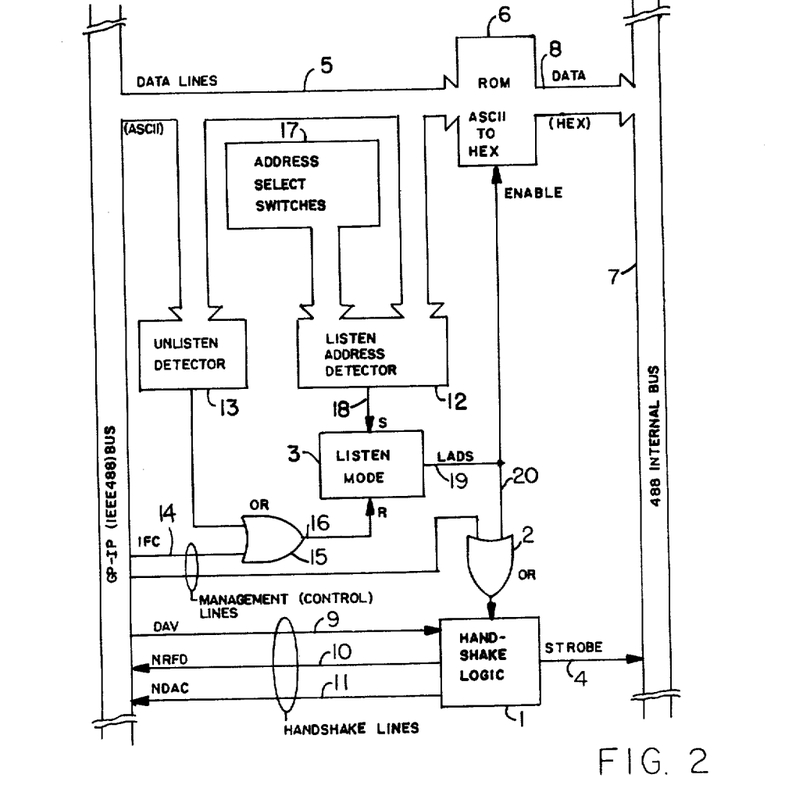
FIG. 2 is a block diagram of the SN-488 programming functions connected between the GP-IB and the internal bus.

FIG. 2 is a block diagram of the essential components interconnecting the GP-IB and the SN-488 internal bus in accordance with the present invention. The handshake logic 1 accepts inputs from ATN (attention) or listen mode 3 through OR gate 2 and DAV (data available) over line 9. Handshake logic 1 replies NRFD (not ready for data), NDAC (data not accepted) over lines 10 and 11 respectively and strobes the internal bus 7 over line 4. Reference is again made to Hewlett-Packard Condensed Description Part No. 59401-90030 for further details of the handshake process and its operation.

FIG. 2 includes two decoding devices, namely, listen address detector 12 and unlisten detector 13 both coupled to the data lines. There are two occurrences which are used to clear the interface, one an IFC signal over line 14 and the other an unlisten coded signal over the data lines 5 actuating unlisten detector 13. The two unlisten signals are OR gated through OR gate 15 and applied to listen mode control 3 over line 16 to clear any response being processed. The listen address detector 12 is set to respond to a predetermined coded signal from the data lines by means of address select switches 17 which are manually operated switches set to accept or decode a predetermined coded data signal for a particular piece of equipment to be programmed. The listen address detector 12 upon receiving its address signal, outputs over line 18 to listen mode control 3 which in turn signals handshake logic 1 over lines 19-20 and enables ROM 6. The ROM 6 is an ASCII to HEX code converter which is required here since the data lines carry ASCII coded signals while the system of the present invention is designed to use HEX coded signals.

It can be seen from the above that the present invention uses the three handshake lines (DAV, NRFD and NDAC), two control lines (IFC and ATN) and the eight data lines. The other three control lines are not required for the listener mode only of the present invention.

Figure 3:
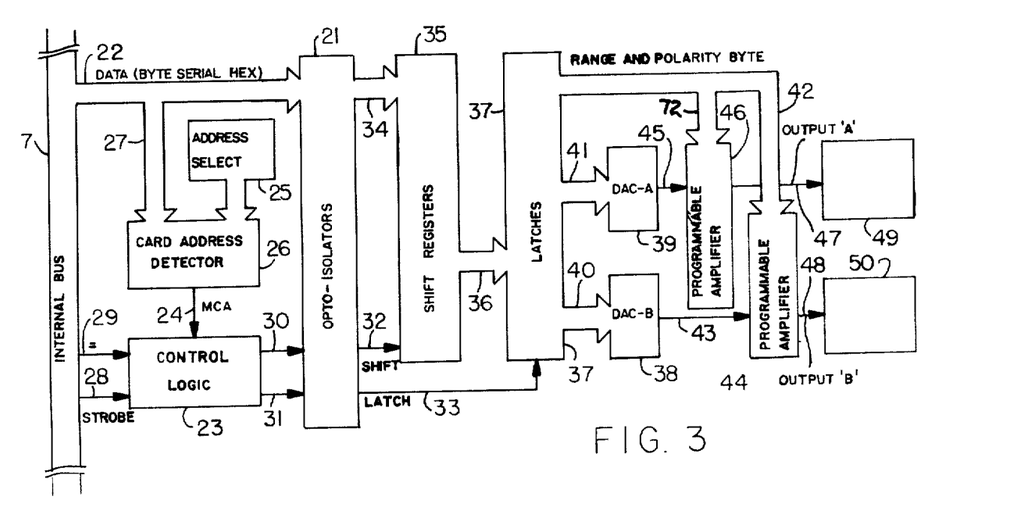
FIG. 3 is a block diagram of the SN-488 programming card which functions between the internal bus and the programmable power supplies to be controlled.

FIG. 3 is a block diagram of the interface between the internal bus 7 (see FIG. 2) and the programmable amplifiers and power supplies being controlled. The data (byte serial hex) from internal bus 7 is applied to a series of opto-isolators 21 over lines 22. Control logic 23 accepts control signals MCA over line 24 when the data on lines 22 contain the address set in address select 25 is detected in card address detector 26 and applied over lines 27. Control logic 23 also receives from internal bus 7 the strobe over line 28 and the ASCII signal designated as the equals sign over line 29. The ASCII character "=" received over the GPIB bus is decoded by the PROM 6 and applied over line 29 to the control logic 23. It is used as a delimiter in the data string to separate the card address information from the actual data. The control logic 23 in response to its inputs enumerated above provides two control signals over lines 30 and 31, coupled in opto-isolator 21 to provide a shift signal on line 32 and a latch signal on line 33. The otpo-isolators 21 merely provide optical isolated coupling between lines 22 and 34 as well as 30-32 and 31-33 mentioned above. The isolated data signals from lines 22 appearing on lines 34 are applied to shift register 35 where they are stored and accumulated until a complete complement of signals have been received and a latch signal on line 33 latches the accumulated data (control) signals to latches 37 over lines 36. The signals thus applied are held in latches 37 and applied to digital-to-analog-converters (DAC) 38 and 39 over lines 40 and 41 respectively where analog control voltages are generated in accordance with the applied digital data. The range and polarity signals are applied to lines 42 and 72. The control voltages from DACs 40 and 41 are modified in two programmable amplifiers 44 and 46 by the range and polarity bits over lines 42 and 72 to provide analog voltages for controlling programmable power supplies 49 and 50 over lines 47 and 48 respectively.

Figure 4:
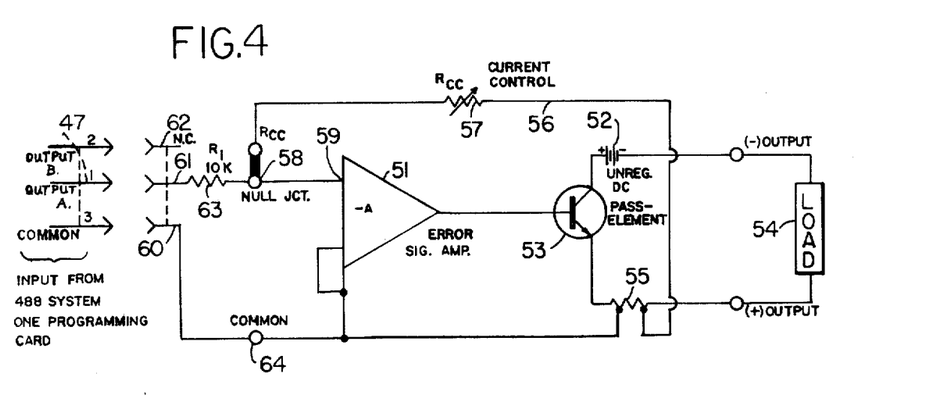
FIG. 4 is a diagram partly schematic and partly block illustrating a single channel of a programmable power supply, connected as a current regulator.
Figure 5:
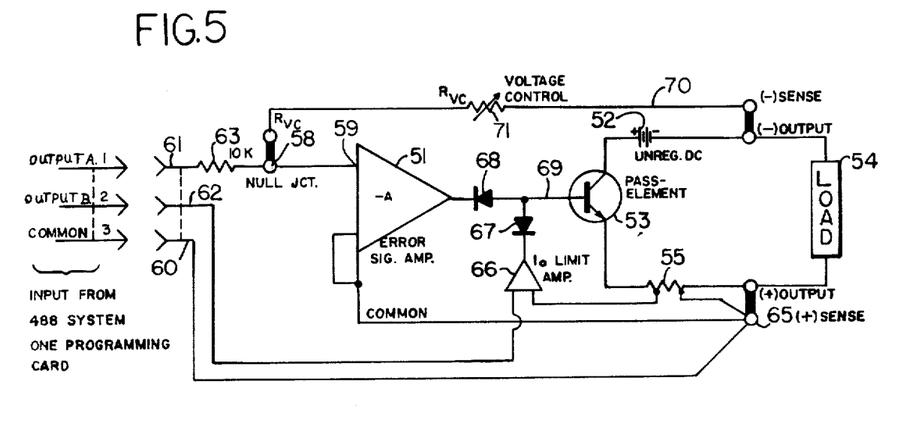
FIG. 5 is a diagram partly schematic and partly block illustrating two channel control of a programmable power supply.

FIGS. 4 and 5 are simplified block diagrams of two typical programmable power supplies adapted to be controlled in accordance with the present invention as described above. The power supply of FIG. 4 comprises the well known combination of an error amplifier controlling current from an unregulated source 52 by means of a pass transistor 53 into a load 54. Load current is sensed across resistor 55 and the sensed voltages is fed back over line 56 and through adjustable current control resistor 57 to null junction 58 connected to input terminal 59 of operational (error) amplifier 51. While three lines 47, 48 and common are provided from the control amplifiers 44 and 46 (FIG. 3) only two are used in this case. Line 60 is the common line going to common point 64 of the power supply. Line 62 is not used, and line 61 carrying analog voltage control signals is connected through source resistor 63 to null junction 58. The equation relating the control voltage, load current, input and current control resistors is as follows:

$$\frac{\text{control voltage}}{\text{current sensed voltage}} = \frac{R_{63}}{R_{57}}$$

Typical values are as follows:
control voltage = 10 volts
current sensed voltage = 1 volt
$R_{63}$ = 10,000 ohms
$R_{57}$ = 1,000 ohms
$R_{55}$ = 1 ohm
Using these constants the load current will be:

current sensed voltage = $R_{55} \times I_L$ (load current)

$$\text{Then } I_L = \frac{10 \times 1000}{1 \times 10,000} = 1 \text{ ampere}$$

The load current is obviously 1 ampere per thousand of current control resistance.

$$I_L = \frac{10 \, R_{57}}{10,000} = \frac{R_{57}}{1,000} \text{ Amperes}$$

FIG. 5 is a simplified block diagram of a programmable voltage regulated power supply with controlled current limiting. The basic error amplifier, unregulated voltage source, pass transistor, current sensing resistor and load are as in FIG. 4 and bear the same numerals. However, this is basically a voltage regulated power supply and the feedback line 70 is connected to the high side of the load and through adjustable voltage control resistor 71 to junction point 58. Line 61 from the control circuits is connected through resistor to junction point 58. The well known relationship in this voltage regulated power supply is as follows:

$$\text{Load voltage} = \frac{R_{71}}{R_{63}} \times \text{control voltage}$$

The control voltage is supplied over line 61 (contained in lines 48) from programmable amplifier 44 (FIG. 3). Common line 60 is connected to common point 65. This power supply is provided with a second error amplifier 66 which is connected to provide a limiting action when the load current tends to exceed a predetermined value. The voltage drop in current sensing resistor 55 is compared with a control voltage over line 62 (from amplifier 44) at the input to error amplifier 66. The pass transistor 53 is controlled by signals applied to its base over line 69. In the absence of over current the error amplifier 51 acts through diode 68 to control the pass transistor in accordance with the above equation for load voltage. However, if amplifier 66 receives an input from current sensing resistor 55 which exceeds its control voltage over line 62, its output tends to go low acting through diode 67 to hold down the voltages on line 69 and controlling pass transistor 53 to cease from response to output from error amplifier 51.

Figure 6:
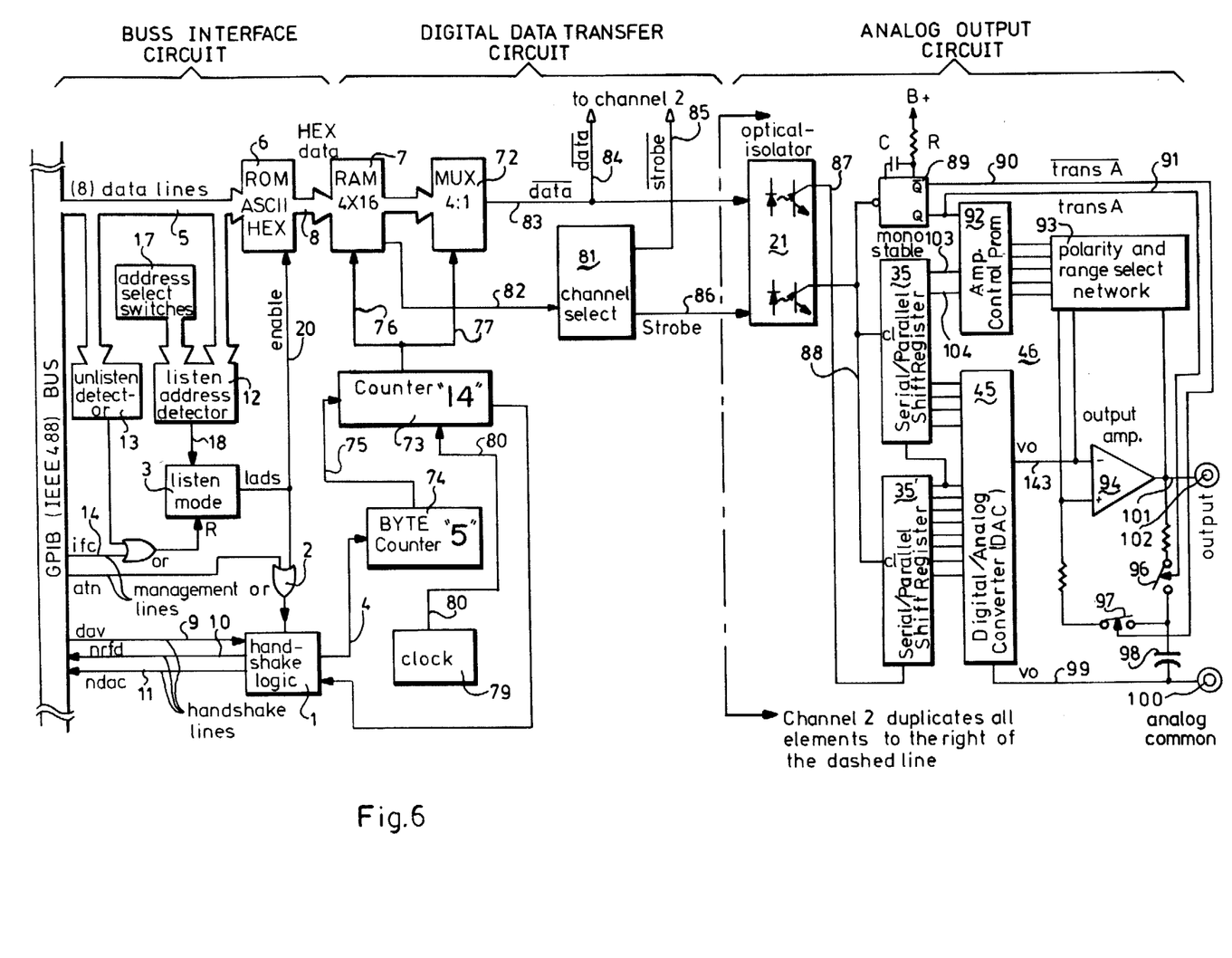
FIG. 6 is a block diagram of the preferred form of the present invention.

The invention as described above is the basis of the preferred form of the invention as shown in FIG. 6, and described in detail below. The programmable amplifier shown in FIGS. 7 and 8 and described below is used in both forms of the invention. The discovery that the programmable amplifier makes possible the simplification led to the preferred form of the invention.

FIG. 6 is a block diagram of the preferred form of the present invention. Brackets at the top of the diagram divide the circuit into three functional ports, namely; "Bus Interface Circuit", "Digital Data Transfer Circuit" and "Analog Output Circuit". The Bus Interface Circuit has been described above being the subject of FIG. 2 and the Analog Output Circuits are the circuits of FIG. 3 to the right of and including the opto-isolators 21 also described above except for the omission of latches 32 which will be described more fully below.

Figure 6A:
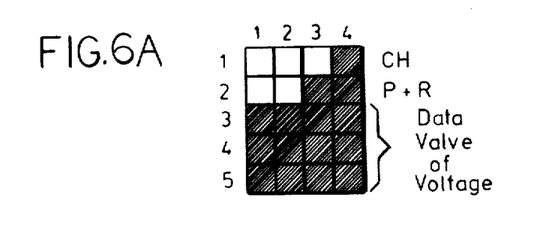
FIG. 6A is a block representation of how information is stored in a temporary memory in FIG. 6.

As described in connection with FIG. 2 above, the information on data lines 5 is in ASC11 code and is converted to HEX (hexadecimal) in ROM 6. This converted data is fed to RAM (random access memory) 7 over four lines 8. This RAM is a so called 4×16 temporary memory in other words it has a capacity of 16 "words" 4 bits per word although its full capacity is not required at this point it it chosen for the job since it is the lowest capacity standard commercial product for the purpose. Actually only five 4 bit words are required as illustrated in FIG. 6A. The first word or byte carries the channel select information (CH) and may call, in this case, for channel 1 or channel 2. The next byte carries the phase and range or multiplier information (P & R). The next three bytes twelve bits of data carrying information as to the voltage value to be programmed. Byte counter 74 coupled to handshake logic 1 over channel 4 controls counter 73 over channel 75 while counter 73 counts 14 i.e. 2 counts for P&R and 12 counts for data. The output of counter 73 over lines 76 and 77 controls RAM 7 to transfer the stored HEX information over lines 78 to multiplexer (MUX 4:1) 72 which in turn serializes data over line 83 to optical isolator 21 and over line 84 to the second channel. Channel selector 81 receiving a signal from ROM 7 over line 82 strobes optical-isolator 21 if channel 1 has been selected or over line 85 to optical-isolator of channel 2 if it has been selected.

As described above in connection with FIG. 3 data is passed on by optical-isolators 21 to shift registers 34 which accumulate the data. In order to clarify the functioning of the Analog Output Circuits of FIG. 6 the operation of the programmable amplifier (46) including PROM 92, polarity and range select network 93 and operational amplifier 94 will be described as shown in FIGS. 7 and 8.

Figure 7:
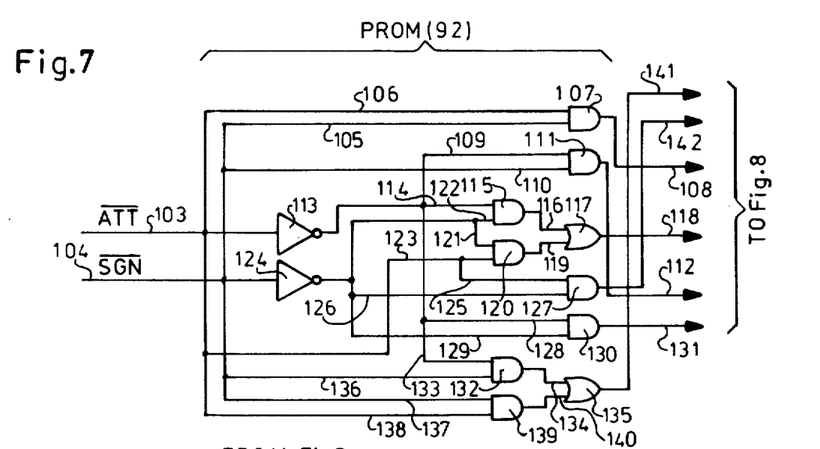
FIG. 7 is a block diagram of inverters and gates useful in explaining the functioning of PROM 92 of FIG. 6.
Figure 8:
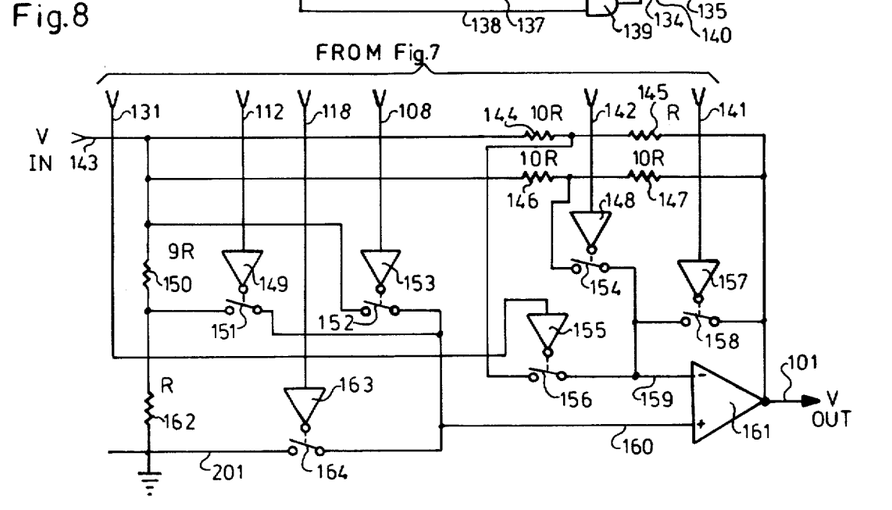
FIG. 8 is a block diagram of the polarity and range select network 93 and programmable amplifier 94 of FIG. 6.
Figure 9:
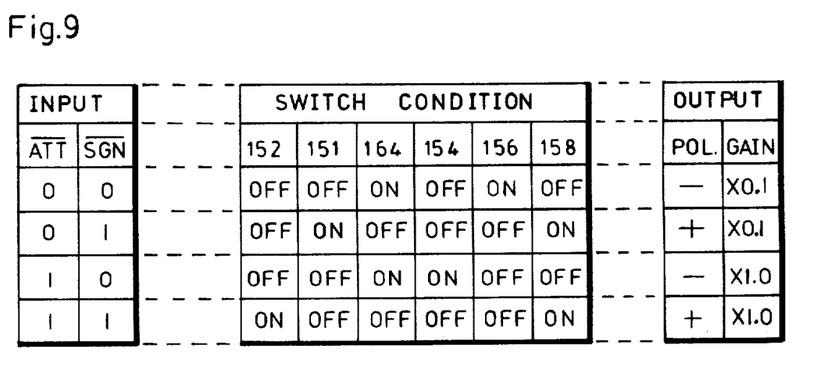
FIG. 9 is a Truth Table useful in explaining the functioning of PROM 92 of FIG. 6 (detailed in FIG. 7) and the programmable amplifier as detailed in FIG. 8.

FIGS. 7 and 8 are detailed block diagrams explaining the operation of the following components of FIG. 6 including; the programmable/sample and hold output amplifier 94 (FIG. 6); the polarity and range select network 93 (FIG. 6); the amplifier control PROM 92 and associated switches in which the programmable output amplifier 94 is operated as a sample and hold amplifier thereby eliminating the necessity of supplying the latches shown in FIG. 3 and described above. In order to clarify the explanation, the PROM 92 equivalent is shown in the form of a plurality of inverters and gates. FIG. 9 is a Truth Table explaining the operation of the inverters and switches of FIG. 8.

FIGS. 7, 8, and 9 are taken together. Two input lines 103 and 104 designated $\overline{\text{ATT}}$ and $\overline{\text{SGN}}$ respectively control the output functions of gain and polarity (POL). The inverters and gates of FIG. 7 convert the four possible input conditions of lines 103 and 104 to actuate switches 152, 151, 164, 154, 156 and 158 as shown in the Truth Table of FIG. 9 and the resulting output conditions.

FIG. 7 will be described below and provides the predetermined switching conditions which are alternately provided by PROM 92 as shown in the Truth Table of FIG. 9. Taking the switches one at a time; line 108 to switch 152 is ON when both lines 106 and 105 to AND gate 107 are 1 (high); line 112 to switch 151 is ON when line 109 as inverted by inverter 113 is 1 and line 110 is 1 turning on AND gate 111; line 118 to switch 164 is ON when lines 114 and 122 as inverted by inverters 113 and 124 turn on AND gate 115 and hence over line 116 to OR gate 117 making line 118 a 1 or when line 123 and line 121 inverted by inverter 124 are both ON causing AND gate 120 to place a 1 on line 119 and thus through OR gate 117 a 1 on line 118; line 142 to switch 154 is ON when line 125 is 1 and line 126 as inverted by inverter 124 is 1 turning on AND gate 127; line 131 to switch 156 is ON when lines 128 and 129 inverted by inverters 113 and 124 respectively are 1 turning on AND gate 130; and line 141 to switch 158 is ON when line 133 inverted by inverter 113 and line 136 are on turning on AND gate 132 placing a 1 on line 134 and through OR gate 135 to line 141 or when line 137 and line 138 are both ON causing AND gate 139 to place a 1 on line 140 and through OR gate 135 to line 141. The inverter symbols 149, 153, 148, 157, 155, 157 and 163 are to be taken as the drivers of switches 151, 152, 154, 157, 158 and 164 respectively.

With the description of FIG. 7 as given above and Truth Table of FIG. 9, the functioning of the various switch combinations as shown in FIG. 8 will now be described. When both input lines 103 and 104 (see FIG. 7) are at logic 0, switches 164 and 156 are closed and the others are open. Switch 164 connects the non-inverting input 160 of amplifier 161 to common line 201 and switch 156 connects inverting input 159 of amplifier 161 to the junction between feedback resistors 144 and 145. Resistors 145, 144, 150 and 162 are labeled R, 9R or 10R indicating their relative values. Thus, with an analog input on line 143 applied to one end of resistor 144 and a feedback ratio of R/10R the input on line 144 is divided by 10 so that the gain as shown in the OUTPUT table is 0.1. Since the input is in effect to the inverting input of amplifier 161, the polarity (POL) of the output on line 101 is negative. To reiterate, 0—0 on input lines 103 and 104 provide a negative output multiplied by 0.1 with respect to the analog signal on input line 143.

To continue, a logic 0 on input line 103 and a logic 1 on input line 104 processed by the inverters and gates of FIG. 7 provide outputs on lines 112 and 141 closing switches 151 and 158. Switch 151 places the analog from line 143 divided by 10 on non-inverting input 160 and switch 158 connects output line 101 to inverting input 159 so that the input appears on output line 101 multiplied by 0.1 and of the same polarity (+).

Next, if logic 1 is applied to input line 103 and logic 0 to input line 104, the inverters and gates of FIG. 7 actuate switches 164 and 154. Switch 164 connects non-inverting input 160 to common line 201 and inverting input 159 to the junction between the two equal resistors 147 and 146. Resistor 147 is also connected to output line 101 acting as a feedback resistor and resistor 146 is connected to analog input line 143. Thus, with equal input and feedback resistors the gain from input line 143 to output line 31 is 1. The input being applied to the inverting input 159 causes the output on line 101 to be inverted (−). Thus, the output is negative at a gain of 1 with respect to the analog input signal on line 143.

Finally, the fourth possible condition is with both input lines 103 and 104 at logic 1 and programmed by the inverters and gates of FIG. 7 closing switches 152 and 158. Switch 152 places the full analog input of line 143 on the non-inverting input 160 providing a non-inverted output on line 101 and switch 158 connects output line 101 to inverting input 159 for a gain of 1. Thus, the output is positive (+) at a gain factor of 1.

The analog switches described above are preferrably solid state switches such as the Siliconix type DG201 or their equivalent.

Solid state switches have several differences when compared with mechanical or electro-mechanical switches. For example, they are much faster, and take less power to operate but, on the other hand, they have significant series resistance when closed. In order for this impedance to be tolerated and not cause errors in the circuits of the present invention, the switches are placed, in all but one instance, in series with the input to the operational amplifier 161. Since the inputs are both high impedance, of the order of megohms, the switch impedances, of the order of a few hundred ohms at most, no appreciable errors are introduced by their use. In one case switch 158 connects output to input of amplifier 161 but without any other input connection, the amplifier will exhibit unity gain from its non-inverting input even with some feedback impedance.

Returning to FIG. 6 after having explained the operation of the programmable amplifier in connection with FIGS. 7 and 8 it is appropriate to return to FIG. 6 with an explanation of the remaining details of the Analog Output Circuit. Output amplifier 94 (programmable as described above) is operated as a sample and hold amplifier. In the hold mode switches 97 and 95 are closed causing amplifier 94 to operate at unity gain repeating the voltage held in capacitor 98 to output terminal 102 over line 101. In order to provide a new output in response to data accumulated in shift registers 35, switch 97 is opened and switch 96 is closed thereby charging capacitor 98 to the new data value. The switching between the sample and hold conditions is controlled by retriggerable monostable multivibrator 89 over lines 90 and 91 respectively. With no data being received from the optical-isolators 87, no signal is provided on line 88 to the multivibrator 89 and its Q output remains high holding switch 96 closed, and thereby sampling the previously stored data in shift registers 35 and outputting it. The instant a new data bit is supplied through the optical-isolators 21 which will add up to a new command, the first bit over line 88 causes monostable 89 to trigger, switching its output from Q to $\overline{Q}$ and closing switch 96 and opening switch 97. The output on terminal 102 is thus held by the sampled charge on capacitor 98 until monostable 89 returns to its initial condition. Now, monostable 89 is provided with a time delay in the form of resistor R and capacitor C so that when it is switched by a data bit it stays switched for a predetermined interval. This interval is made longer than the periods of the data bits so that once a data string is started monostable 89 switches and remains so until a short time after the data string has ended. Once it ends, monostable 89 switches back opening switch 97 and closing switch 96 to provide a new output in accordance with the new data string. In this way the need for the latches 37 are shown in FIG. 3 is eliminated thereby decreasing the cost and increasing the reliability of the system.

Additional details of the sample and hold amplifier operation will be found in U.S. Pat. No. 4,209,753.

Figure 10:
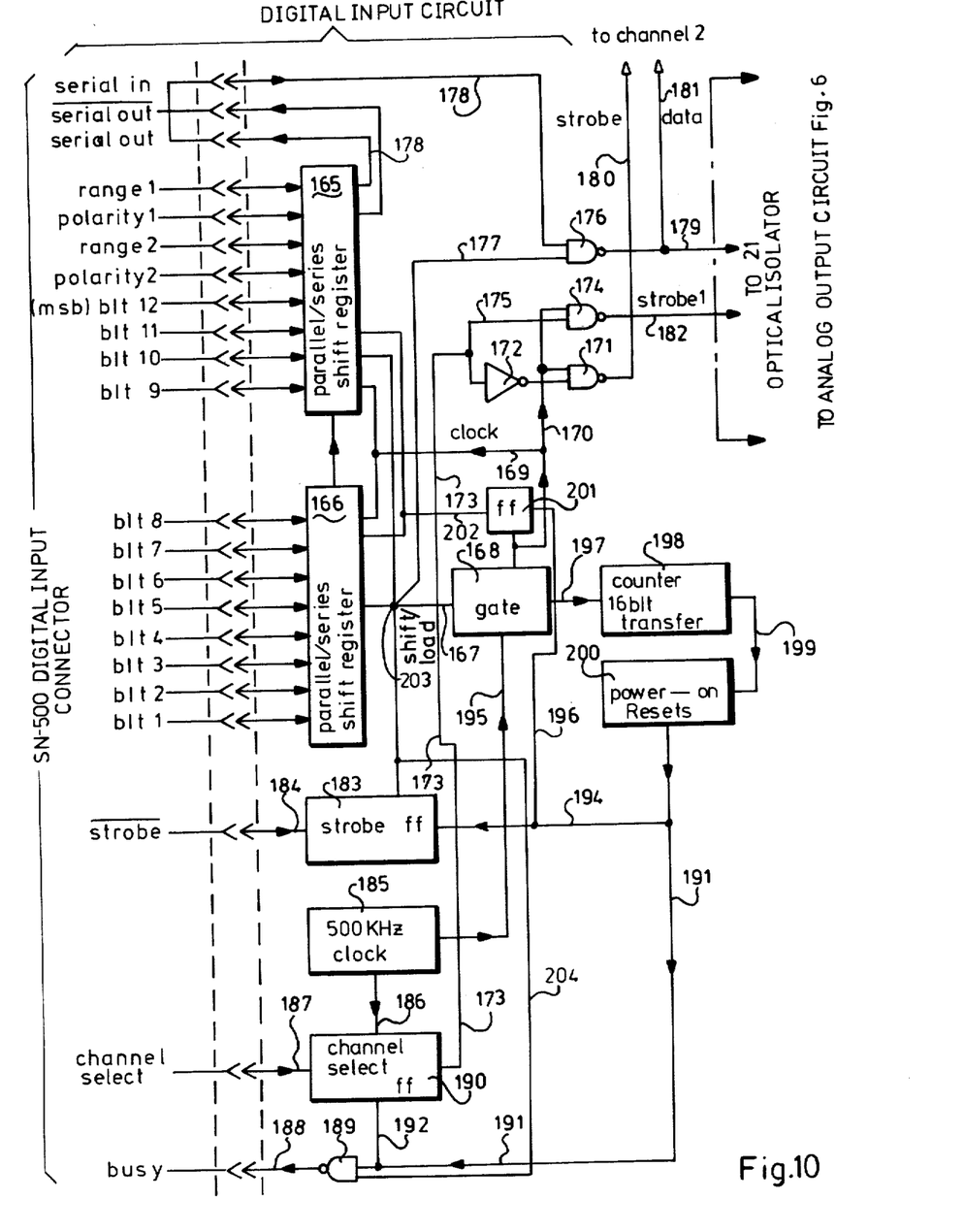
FIG. 10 is a block diagram of a form of the invention useful for utilizing parallel input data.

FIG. 10 shows a modified form of the present invention adapted to receive parallel input data and commands. This form of the invention does not require the Bus Interface Circuit shown and described above but only a Digital Input Circuit and the Analog Output Circuit. The Analog Output Circuit is identical with the circuit of the same designation shown in FIGS. 6, 7 and 8 and described in detail above. The Digital Input Circuit is adapted to receive parallel input data and commands, to serialize this data and to pass the serialized data on to the Analog Output Circuits as described in detail below.

The two parallel to series shift registers 165 and 166 receiver parallel input commands and data over sixteen input lines, eight to each register designated as range 1, polarity 1, range 2, polarity 2 and bits 1 through 12. The serialized commands and data flow out of the upper shift register over line 178 to NAND gate 176. When gate is opened, as will be described below, the commands and serialized data flows over line 178 (channel 1) or 181 (channel 2) to the Analog Output Circuit under the timing control of 500 KHz clock 185. The timing pulses from clock 185 are applied over lead 186 to channel select flip-flop (ff) 190 and to gate 168 over lead 195.

Operation of the system is initialized by reset 200 which applies a pulse to busy NAND gate 189 over line 191 signaling non-busy to busy line 188; resetting strobe flip-flop 183 to place strobe line 184 in receptive condition and flip-flop 201 to inhibit read out of registers 165 and 166 over line 202. With these conditions set up shift registers 165 and 166 may receive their parallel input commands and data. In the absence of a strobe signal on input 184, strobe flip-flop 183 applies an inhibit signal to junction 203 closing gate 168 over line 167, permits loading of registers 165 and 166 and closes data gate 176 over line 177 and blocks clock signals over input line 195 to gates 171 and 174 over line 170 and clock signals to registers 165 and 166 over line 169. Under these conditions parallel input signals to register 165 and 166 may be received but no strobe can pass through gates 171 or 174 and no data can pass through gate 176. During data loading a channel select signal designating either channel 1 or channel 2 is applied to channel flip-flop 190 over input line 187.

Once data has been loaded into registers 165 and 166 the system is ready for the serial read out. This read out is initiated by applying a strobe pulse to strobe flip-flop 183 over line 184 which in turn changes the condition at junction point 203 which in turn unblocks gates 168 and 176. The leading edge of the first clock pulse following this unblocking of gate 168 passing clock pulses to open strobe gates 171 or 174 depending on which channel has been selected and releases flip-flop 201 permitting clock pulses to read out registers 165 and 166 at the trailing edges of the clock pulses. At the same time counting is started in counter 198.

Now, under these conditions serial data is clocked by the trailing edges of the clock pulses out of registers 165 and 166 over line 178, through gate 176 and over line 179 to the analog output circuits, optical isolator 21, etc. to complete the control and application of data to the output devices being controlled (as described in connection with FIGS. 7, 8 and 9 above).

As can be seen there are 16 input lines carrying commands and data into registers 165 and 166. In other words these registers when filled can hold up to 16 bits of information. Accordingly they will be emptied when 16 bits are read out serially. This reading out is monitored by 16 bit counter 198 which fills at the 16th count. At the 16th count this counter sends a pulse over line 199 to reset 200 which in turn returns strobe flip-flop 183 to its initial condition over line 194 and opens busy gate 189 over line 191. The system is now ready to receive and process the next set of commands and data repeating the sequence described above.

While the preferred form and modified forms of the present invention have been shown and described, further modifications are possible within the spirit and scope of the invention which is set forth in particular in the appended claims.

I claim:

1. In a digital information interfacing system for utilizing data bytes from a plurality of data lines to provide analog voltage control of voltage/current programmable power supplies, the combination of;
    means coupled to said data lines for temporary storage of said data bytes received from said data lines to provide stored data bytes;
    means coupled to said data lines and said temporary storage means for controlling a predetermined number of bytes being accepted by said temporary storage means;
    means coupled to said temporary storage means for serializing said stored data bytes;
    means for passing said serialized data bytes through optical isolation means to provide isolated data;
    means including a series to parallel shift register for converting said serial isolated data to parallel form;
    means including a digital to analog converter for converting said parallel data to analog form;
    means responsive to said analog form data for generating an analog voltage;
    and means for using said analog voltage to control said programmable power supplies.

2. A digital information interfacing system as set forth in claim 1, and
    wherein said temporary storage means comprises a random access memory (RAM).

3. In a digital interfacing system for utilizing data bits from a plurality of data lines to provide analog control voltage for the control of voltage/current programmable power supplies, the combination of;
    parallel to series shift register coupled to said data lines for temporary storage of said digital data bits received from said data lines to provide temporarily stored digital data bits;
    means coupled to said data lines and said parallel to series shift register for controlling a predetermined number of bits being accepted by said parallel to series shift register;
    means connected to said shift register for passing the output of said register in series through optical isolation means to provide isolated digital data bits;
    means including series to parallel shift register means for converting said serial isolated data bits to parallel form;
    means including a digital to analog converter for converting said parallel data to analog form;
    means responsive to said analog form data for generating an analog voltage;
    and means for using said analog voltage to control said programmable power supplies.

* * * * *